United States Patent [19]

Sluimer

[11] Patent Number: 5,171,590

[45] Date of Patent: * Dec. 15, 1992

[54] METHOD OF PREPARING FROZEN PIECES OF DOUGH AND OF PREPARING DOUGH PRODUCTS

[75] Inventor: Pietar Sluimer, Renkum, Netherlands

[73] Assignee: Ahold Retail Services A.G., Aug, Switzerland

[*] Notice: The portion of the term of this patent subsequent to Oct. 1, 2008 has been disclaimed.

[21] Appl. No.: 748,228

[22] Filed: Aug. 21, 1991

Related U.S. Application Data

[63] Continuation-in-part of Ser. No. 482,281, Feb. 20, 1990.

[30] Foreign Application Priority Data

Feb. 22, 1989 [NL] Netherlands ................ 8900436
Feb. 16, 1990 [FI] Finland ................... 900778

[51] Int. Cl.$^5$ .............................. A21D 2/00
[52] U.S. Cl. ........................ 426/19; 426/62; 426/486; 426/512; 426/523; 426/524; 426/549
[58] Field of Search .......... 426/19, 62, 523, 549, 426/512, 486, 524

[56] References Cited

U.S. PATENT DOCUMENTS

| | | | |
|---|---|---|---|
| 4,369,193 | 1/1983 | Collins et al. | 426/19 |
| 4,372,982 | 2/1983 | Haasl et al. | 426/549 |
| 4,374,151 | 2/1983 | Lindstrom et al. | 426/19 |
| 4,406,911 | 9/1983 | Larson et al. | 426/524 |
| 4,407,827 | 10/1983 | Tanaka et al. | 426/19 |
| 4,450,177 | 5/1984 | Larson et al. | 426/524 |
| 4,847,104 | 7/1989 | Benjamin et al. | 426/19 |

FOREIGN PATENT DOCUMENTS

| | | |
|---|---|---|
| 254639 | 3/1961 | Australia . |
| 0114450 | 8/1984 | European Pat. Off. . |
| 0115108 | 8/1984 | European Pat. Off. . |
| 0145367 | 6/1985 | European Pat. Off. . |
| 0194189 | 9/1986 | European Pat. Off. . |
| 0311240 | 4/1989 | European Pat. Off. . |
| 2344229 | 10/1977 | France . |
| 2589043 | 4/1987 | France . |

OTHER PUBLICATIONS

Proceedings, 56th Meeting, American Society Baking Engineers (ASBE), pp. 38-43 (1980) Boyd, "Manufacture and Processing of Frozen Dough".

Primary Examiner—R. B. Penland
Attorney, Agent, or Firm—Pennie & Edmonds

[57] ABSTRACT

A method of preparing frozen pieces of dough, in which dough is kneaded and subsequently fully shaped and fully proofed. The doughpieces are then frozen. The pieces of dough can be stored in a freezer for some time and subsequently removed from the freezer and, without defrosting step, placed in an oven and baked. The dough is kneaded to a higher energy input then in usual bread making techniques. In the presently preferred initial embodiment, alcohol is added to the dough ingredients during mixing of the ingredients.

26 Claims, 1 Drawing Sheet

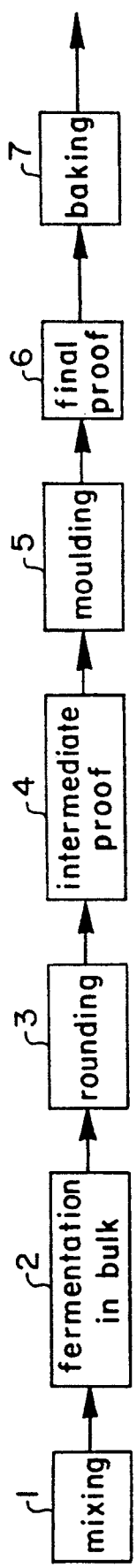
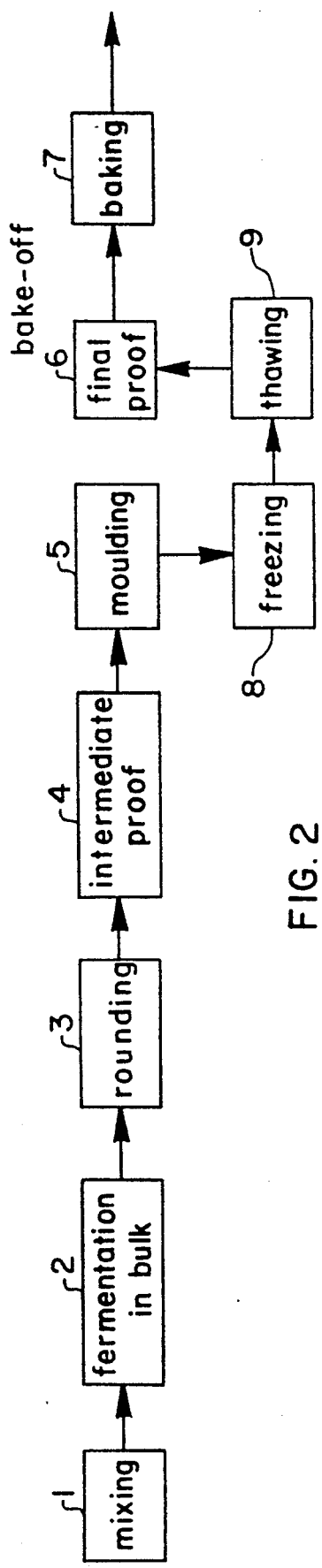
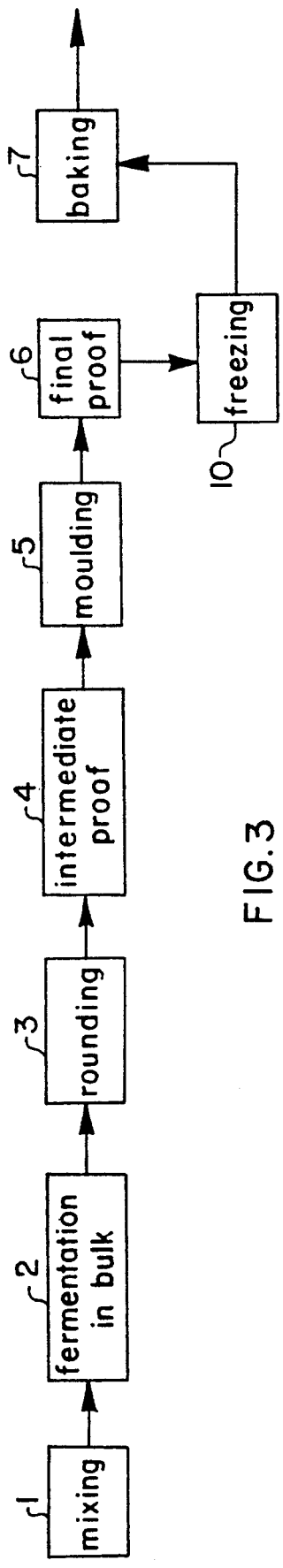

METHOD OF PREPARING FROZEN PIECES OF DOUGH AND OF PREPARING DOUGH PRODUCTS

CROSS REFERENCE TO RELATED APPLICATION

This application is a contination-in-part of my earlier application Ser. No. 482,281, filed Feb. 20, 1990.

FIELD OF THE INVENTION

This invention relates to a method of preparing frozen pieces of dough. The invention also relates to a method of preparing dough products.

BACKGROUND OF THE INVENTION

The preparation of bread or pastry in which yeast is used as a proofing agent comprises substantially the following steps. First, the dough ingredients are mixed and kneaded. Next, the so-called preproofing or bulk fermentation and preshaping take place. Preproofing or bulk fermentation is not required in making of so called "no time" dough. Subsequently, the so-called intermediate proofing step and the definitive shaping take place. Finally, the final proofing or pan proofing takes place and then the fully raised, i.e., the fully proofed and shaped dough is baked. The end product is a baked bread or pastry product.

The total process takes quite a long time, depending on the ingredients used, local tradition and the like, and in certain cases may be as long as six or eight hours. The process cannot be interrupted, in principle, since the action of the yeast, i.e. the proofing process, continues.

Owing to the long duration of this process and the demand for fresh bread and pastry in the morning hours, preparation mostly takes place during the night, which is felt as a drawback. Besides, variations in demand cannot be coped with. Therefore, a possibility to interrupt the preparation process has been looked for. The process can then take place, at least partly, at a more convenient point of time and, if desired, in a different place.

It is known to cool the dough after shaping and prior to the final proofing, to e.g. $-12°$ C. The proofing process is then interrupted and can be resumed one or some days later.

It is further known to freeze a definitively shaped doughpiece prior to the final proofing. Such a frozen doughpiece can be further processed up to about 3 months later. To that effect, the doughpiece is first defrosted at $0°$ C., which may take from one to ten hours, depending on the weight. Thereafter the final proofing takes place at normal temperature for 1 to 1½ hours and finally, the doughpiece is baked. Accordingly, this so-called bake-off process takes much time, so that a similar drawback is encountered as in the non-interrupted bread preparation process.

The patented prior art discloses various bread manufacturing techniques some of which involve the production of frozen dough pieces.

EP-A-0,115,108 (General Foods Corporation) corresponds to U.S. Pat. No. 4,847,104 and discloses a method of freezing a fully shaped and finally proofed doughpiece. EP-A-0,115,108 has as its main purpose improving the frozen storage shelf life of frozen dough. The frozen doughpiece, according to the known method, can be placed directly from the freezer in an oven to be baked off. To obtain a good quality of the end product, however, it is necessary according to this known technique, to use flour having a protein content of 16% or higher. Such a protein-rich flour, however, is difficult to obtain and expensive.

EP-A-0,145,367 (General Foods Corporation) discloses a method of preparing entirely proofed baking dough, enabling one to freeze doughpieces formed therefrom and, after a given storage period, to place these directly from the freezer in an oven to be baked. Defrosting and final proofing are not necessary according to EP-A-0,45,367. When flour having a protein content lower than 16% is used, the dough is kneaded at a low intensity and the doughpieces are frozen slowly. However, such a pastry dough is unsuitable for preparing bread products, and so is the method described. EP-A-0,145,367 further discloses two-phase mixing. The first phase is a usual premixing step and the second phase is a real kneading step which is maintained for five minutes only. At that time, the dough is not yet fully developed and the temperature is about $18°$ C.

EP-A-0,114,450 (General Foods Corporation) corresponds to U.S. Pat. Nos. 4,406,911 and 4,450,177 and describes a method of preparing entirely proofed, frozen doughpieces from bread dough. Doughpieces can be baked off in an oven directly from the freezer, without an intermediate defrosting step. To obtain an end product of good quality according to this known technique, it is necessary that gum, surfactants and ingredients that can form a protein film are added to the dough.

EP-A-0,194,189 (Grands Moulins de Pantin) describes a method of preparing French bread, in which frozen doughpieces are prepared that can be placed directly from the freezer in an oven to be baked off. The technique described, according to which the doughpieces should rise at low temperature (about $0°$ C.) for a prolonged period (about 48 hours) and subsequently be frozen at $-50°$ C., requires much time and is difficult to realize in actual practice.

French patent application 2,589,043 (SGP Armoricane) relates to the production of a dough for French bread which may be frozen and stored. When preparing the French bread, the frozen dough is taken from the freezer, thawed and only then baked off.

FR-A-2,344,229 (Bourdon) describes a method of preparing products from puff pastry dough. A flour is used that is rich in gluten. The pieces formed from the puff pastry dough are caused to rise, but the proofing process is discontinued abruptly half-way by freezing the doughpieces quickly.

EP-A-0,311,240 (Rheon) relates to a special method of treating a dough by stretching it while subjecting it to vibrations.

Collins in U.S. Pat. No. 4,369,193 discloses a kneading method for the production of soft bread, according to which method a relatively large amount of energy is applied. Collins does not relate to the production of frozen dough pieces. Collins specifically relates to the production of so-called "no-time" dough, which is a dough that does not require fermentation in bulk. Collins aims at improving the old so-called Chorleywood Bread Process of bread production which has been generally abandoned in the 60's because various problems. The texture problem has apparently been solved by Collins but another problems remains. This is the problem that the development of aromatic substances which normally occurs during proofing cannot take place in a satisfactory manner.

Lindstrom in U.S. Pat. No. 4,374,151 discloses using alcohol in leavened dough which must be frozen. Lindstrom prescribes placing the frozen dough in a cold oven which makes his method unsuitable for commercial purposes. Further, Lindstrom uses a rather large amount of alcohol as a melting point depressant so as to allow the dough to quickly thaw before the oven reaches its baking temperature.

It appears from the above cited literature that it has been tried in the past in various manners to develop methods for both bread products and other dough products, according to which a frozen doughpiece can be prepared that has a long storage and shelf life in frozen condition and which can be baked off directly from the freezer with and without an intermediate defrosting step.

A drawback of the known methods is that in actual practice these are difficult to realize and/or time-consuming and/or expensive, while also the quality of the end product is not always optimal.

SUMMARY OF THE PRESENT INVENTION

The present invention relates to the preparation of dough products and most specifically bread products and to frozen pieces of bread dough. The invention also provides an improved effective method of preparing such products, and frozen pieces of dough. According to the invention, a method is provided for preparing dough products in which fully shaped and fully proofed doughpieces are prepared and frozen. The frozen doughpieces are stored in a freezer for some time, and subsequently taken from the freezer and, without defrosting step, placed in an oven and baked. In accordance with the invention, the dough is kneaded as part of the mixing of the ingredients at a relatively high energy level. According to a further elaboration of the invention, a small amount of alcohol is added to the dough ingredients.

BRIEF DESCRIPTION OF THE DRAWINGS

FIG. 1 is a flow sheet illustrating a known bread preparation process without interrupted proofing;

FIG. 2 is a flow sheet illustrating a known bread preparation process with interrupted proofing; and FIG. 3 is a flow sheet illustrating a method according to the present invention.

DESCRIPTION OF THE PREFERRED EMBODIMENTS

FIG. 1 is a flow sheet showing a normal bread preparation process without interruption. At 1 the dough, made from the desired ingredients and containing yeast, is mixed and kneaded. At 2 pre-proofing, if necessary, takes place, at 3 preshaping, at 4 intermediate proofing and at 5 shaping. During shaping, the doughpieces are brought into the final shape, with or without the use of pans. At 6 the final proofing or pan proofing takes place and at 7 the bread product is baked.

According to the method illustrated in FIG. 2, the process is interrupted after shaping (step 5), because the doughpieces formed are cooled to a temperature substantially below 0° C., e.g. by freezing. The freezing step is shown diagrammatically in FIG. 2 with a block 8 and the defrosting step with a block 9.

A process in which, prior to the final proofing step, the doughpieces are frozen for them to be baked later, mostly in a different place, is called a bake-off process. An additional advantage of the bake-off process is that the bread can be baked in the shop itself, which is attractive for the consumer. However, a drawback is the long duration of the bake-offs process, including defrosting, so that accurate planning is required and bread cannot be baked in the shop without more processing at any point of time of the day. In that case too, no allowance can be made, in fact, for short-term variations in the demand for bread products. Moreover, the known bake-off process usually necessitates a defrosting cell in which a temperature of 0° C. prevails. Quicker defrosting results in an inferior dough structure and also has an adverse effect on the yeast cells.

According to the present invention, the bread product preparation is interrupted, not after shaping, but after the final proofing step by freezing the afterproofed doughpieces, as illustrated in FIG. 3 at 10. Doughpieces thus frozen can be baked off directly, and without defrosting, in a preheated or non-preheated oven; and a good product can be obtained. Consequently, prior, slow defrosting is not necessary and the final proofing has already been accomplished before the freezing step. A defrosting cell can be dispensed with as well. As a result, baking can take place at any desired moment and hence can be effected in the supermarket, but also in the consumer's home without any problems.

According to a further elaboration of the present invention, at least for certain types of bread products, the quality of the end product is further enhanced by imparting to the dough an excess of baking value, which as used herein means the capacity of a flour to withstand prolonged mixing so that the dough is able to retain the entrapped gas during baking to a higher extent than usual.

A first possibility therefor is the use of a much better flour quality than conventional. The flour which permits high energy or prolonged mixing and produces a good dough stability, such as of a wheat flour or flour which has been fortified with wheat gluten flour.

In accordance with the teachings of the present invention, the stability of the dough is important and it is important to have good mixing in order to obtain a stable preproofed frozen dough. Preferably a high energy level is inputted into the kneading (mixing) step which is in the order of 160% or more of the normal energy level employed in mixing. The high energy level of mixing can be achieved by high intensity mixing or prolonged mixing at a lower intensity or some combination of the two.

The energy level of the mixing is a measure of the extent of mixing; and friction is the phenomena used in describing the extent of mixing. The consumption of electrical energy by the mixing motor is, in turn, a yardstick for the friction that has been applied: the higher the consumption of electrical energy, the more the friction and the better the extent of mixing. This yardstick for dough development has already been used for more than 30 years in the so called Chorleywood Bread Process. Normally in the Chorleywood Bread Process, the energy consumed as the mixer is running idle is deducted from the total electrical energy consumed. This results in a so called net mixing energy. In the Chorleywood Bread Process, net mixing energy is 40 kJ per kg of dough. In the usual American and European bread making, the net mixing energy is about 25–35 kJ per kg of dough.

In the Collins U.S. Pat. No. 4,369,193, total mixing energy has been used in describing his mixing procedure. Collins mixes with an energy input of 15 to 21

Watt hours as compared to the 11 Watt hours for the Chorleywood Bread Process.

As distinguished from the level of energy input in Collins, the total mixing energy with the present invention is between 80-100 kJ per kg of dough, though it is possible to make an acceptably stable preproofed frozen dough with less mixing energy, say 60 kJ per kg of dough. The energy input into the mixing step is in all cases high enough to assure that the dough reaches the stage where it is fully developed. The stages of dough development during mixing are well standardized and known in the baking art, see EP-A-0,145,367 at page 12. The stages are fully described by E. J. Pyler in *Baker Science and Technology* (Sibel Publishing Co., Chicago, Ill., 1979) at pages 596-608 which are hereby incorporated by reference.

An alternative to the consumption of electrical energy as a yardstick for friction in measuring the extent of mixing is the increase of temperature of the mixture of raw materials or ingredients during mixing. In usual bread making procedures, this increase in temperature is in the order of 10° C. or less and 15° C. in the Chorleywood Bread Process. With the present invention, the temperature rise of the raw materials is more than 10° C. and preferably between about 15° and 22° C. A resulting dough temperature in the range of 15°-30° C., and preferably about 25° C. for bread is produced.

The energy input into the mixing step can also be controlled, as stated above, by the intensity of mixing. For example, the energy level can be increased to 160% of the normal energy level employed by maintaining the same length of time of mixing and simply increasing the intensity to the 160% level. Thus, if the intensity of mixing is high, the required energy is consumed in a short time. On the other hand, if the intensity is low, the mixing time will be longer. A combination of mixing intensity and time will embody energy consumption.

A good end result is enhanced by adding alcohol during the dough preparation, as indicated with an arrow 12 in FIG. 3. Alcohol of a purity of 98%, preferably ethanol, can be added during the kneading or mixing step, in a quantity of between about 1 and 3%, preferably 2% of the weight of the flour used for the preparation of the dough. In terms of water content in the dough ingredients, and assuming about 60% dough water by weight of the flour has been used, the percentage of ethanol preferably varies between about 1.5 and 4% although a lower amount of say 1% is technologically usable but the effect will be smaller. In actual practice, amounts between about 3 and 3.5% by weight of water are used.

Higher percentages are not practical as it reduces yeast activity and the speed of fermentation too much. The effect of the addition of ethanol has no significant effect on the depression of the melting point of the dough. The addition of ethanol to the dough in the above quantity results in softer doughs with a better machinability. This results in a better and more even crumb texture. With percentages lower than 1.5 on dough water basis, the effect will be smaller.

The role of ethanol is not fully understood. The melting point of a normal bread dough as measured by differential scanning calorimetry is about −6° C. By adding 5% ethanol on a flour basis (8% on a dough water basis), the melting point of the dough can be lowered to −10° C. With the amount of ethanol used in the procedure of the present invention (e.g. 1% on a flour basis, or 1.6% on a dough water basis), the depression of the melting point is smaller than 1° C. and not generally significant as far as making bread from frozen doughpieces is concerned. It is therefore believed that the improving action on bread quality of this small quantity of ethanol cannot be attributed to its melting point depressing action. It is instead believed that gluten development during mixing proceeds better and more completely if preferably 1-2% ethanol, by weight of the flour, is added to the dough ingredients. With this amount of alcohol, good gluten development (in other words, good stability of the dough structure) is obtained by extended mixing with a good mixing intensity as described above.

Another measure preferably taken with the preparation of the dough pieces of the present invention is extreme degassing during the shaping phase. As a result, a finer distribution of carbon dioxide gas in the dough is obtained. The finer distribution of carbon dioxide gas produces a finer crumb structure. This in turn provides more resistance to collapsing during the subsequent freezing step. Big cells, on the other hand, with thick cell walls will tend to collapse and give big holes in the crumb of the bread after baking. Degassing may be effected, for example, by rolling out the dough into a thin layer which is thinner than normal (2 cm) by a factor of two. Alternatively, during the kneading step, gas inclusions can be avoided by kneading in a partial vacuum.

By using an adapted yeast strain, a good end result can be promoted. Suitable yeast strains are those used in the bake-off process for use in deep-freeze dough. Moreover, a high yeast percentage is preferably used, e.g. in the order of 6-10% of the flour weight, instead of the normally employed percentage of about 2%.

For certain products, such as a big loaf, the dough can be frozen in a pan wherein the product can be directly baked later.

Freezing is effected at a relatively high temperature. In general, foodstuffs should be frozen as quickly as possible. To that end, the freezing temperature can be −80° C. Dough does not allow this, inasmuch as it would destroy the yeast cells present at or near the exterior of the doughpieces. Therefore, in the process according to the present invention, the dough is frozen at the relatively high temperature of about −15° to −40° C. and preferably between about −18° and −30° C.

When one or more lengths of wet string are placed over the frozen doughpieces, and the doughpieces are subsequently baked in an oven, this has a favorable effect on the course of the baking process, while at the same time the bread obtains an attractive appearance. At the location of the strings, crust formation during the baking process is retarded. As a result, steam developed in the bread during the baking process can escape at the location of the strings.

In the presently preferred embodiment of the invention, a groove or number of grooves are cut into the upper surface of the frozen doughpieces. This is done after the doughpieces are frozen and before storing. In a normal sized loaf of bread, for example, the groove would be abut ¼ cm in width and depth. Before baking, this groove is wet as by placing a piece of wet string in the groove. Crust formation in the groove is thus retarded and internal gases permitted to escape. The resulting baked bread will have a rupture along this groove as is typically found in bread products. If however the wet groove and/or wet string were not employed, the frozen doughpiece would tend to rupture during the baking process at any haphazard location to permit the escape of internal gases. This would result in a product which may not be aesthetically pleasing. Also, on a commercial scale, the loaves of bread will not be uniform in appearance, one to another. These disadvantages are avoided with the wet groove and string of the present method.

During baking of the frozen doughpieces of the present invention, the oven is preheated to the baking temperature and the doughpieces placed in the oven without thawing or defrosting. The ability of the frozen doughpieces to be baked in this manner is especially important for commercial baking where the oven is used repeatedly in a short period of time to bake a number of products. There, it would be completely impractical to cool the oven between each baking.

In addition to using a preheated oven, the baking advantageously is conducted with the use of steam. The steam assists in producing acceptable oven rise and a regular loaf.

Steam is added at the beginning of the baking step for several reasons. First, the baking time is longer with frozen doughpieces than with doughpieces which are not frozen. This is so because with frozen doughpieces, the penetration of the heat to the interior of the doughpiece is slower. Further, after steaming the crust of the product becomes wet. Because of this an elastic crust is obtainable. This permits more oven spring than otherwise possible. If steam is not used, the product will burst at several unexpected places and produce an irregular product. With the use of steam together with a cut groove in the doughpiece, the groove becomes the weakest place and the doughpiece will burst along the groove.

Steam is also important with the method of the present invention in that during baking with steam, the moisture stays in the doughpiece because there is enough steam in the baking chamber, therefore, the product will not dry out.

Preferably, but depending on the type of loaf being produced, steam is allowed to escape just before the end of the baking time. After letting the steam out of the baking chamber, the moisture of the crust can escape. This produces a crusty product.

The steam pressure used in the baking step is not more than about 0.5 atmospheres. If high pressure steam is used, the steam temperature is more than 100° C. This is not good for the product.

An experimental test example of the method of preparing fully proofed frozen doughpieces and the resulting baked products in accordance with the teachings of the present invention is given below. As a comparison with this example, a procedure using a lower energy level mixing and a high amount of alcohol such as described in the Lindstrom U.S. Pat. No. 4,374,151 was also followed and the results given along side those for the method of the present invention.

EXAMPLE I

A. MATERIALS

All materials were commercially available raw materials. As flour "Beschuitbloem Dutch Best" of Meneba BV, Rotterdam, Netherlands, was used. The analysis of the flour is given below.

|  |  | Method |
|---|---|---|
| moisture in % | 14.5 | ISO 712 |
| ash in %[1] | 0.55 | ISO 2171 |
| protein (N × 5.7)[1] | 15.3 | ISO 1871 |
| Hagberg number | 316 | ICC 107 |
| Zeleny value | 53 | ICC 116 |
| Farinograph water absorption |  | ICC 115 |
| water absorption[2] | 61% |  |
| dough development time | 6 min |  |
| dough stability | 8 min |  |
| degree of softening | 45 BE |  |

[1] on a dry basis
[2] on 14% moisture basis

As bread improver S-500 of Puratos, Belgium, was used. Instant yeast "Fermipan" of Gist-Brocades was used in the frozen dough process of the Lindstrom patent whereas compressed yeast "Koningsgist" was used in the process of the present invention.

B. PROCEDURES

The bread making processes were carried out with 10 kg of flour. The following recipes (in kg) were used:

|  | Lindstrom | Present Invention |
|---|---|---|
| flour[3] | 10.000 | 10.000 |
| water | 5.700[1] | 5.700[2] |
| salt | 0.250 | 0.200 |
| yeast "Fermipan" | 0.500 | — |
| yeast "Koningsgist" | — | 0.500 |
| sugar | 1.200 | — |
| non-fat dry milk | 0.400 | — |
| ethanol | 0.300 | 0.200 |
| bread improver | 0.300 | 0.300 |

[1] water temperature 20° C.
[2] of which 300 g was added as ice cubes, water temperature 0° C.
[3] flour temperature 10° C.

All ingredients were mixed in a Kemper SP 15 spiral mixer for 2 minutes at a low speed (140) rpm), and in the remaining time at high speed (280 r.p.m.). Mixing was completed at a dough temperature of 28° C. The mixing time (high speed) was 7 minutes for the Lindstrom dough and 12 minutes for dough of the present invention. Also, with the process of the present invention, the energy input was about 100 kJ per kg of dough which was about 160° higher than in the Lindstrom process.

After mixing both doughs were divided into pieces of 800 g and rounded by hand. An intermediate proof of 30 minutes was given. The dough pieces were molded and given a final proof in a proofing cabinet at 30° C. and 80% humidity. Changes in the specific volume of the dough pieces were measured according to the Archimedean principle: dough pieces were immersed in a water basin, placed on a scale and the water displacement was measured.

Dough pieces according to Lindstrom were proofed to a specific volume of 2.0 liters per kg, those of the present invention to a specific volume of 4.0 liters per kg. For the Lindstrom dough, the final proof time was 90 minutes, for present invention, 50 minutes.

Dough pieces were subsequently frozen at −30° C. for 4 hours and stored in polytene bags at −20° C.

After 2 days storage at −20° C. dough pieces were baked. The Lindstrom dough pieces were placed in a cold oven, which was heated to 200° C. Heating was done electrically. Baking time performed 40 minutes. For the present invention, dough pieces were baked in an oven preheated to 240° C. The dough pieces were placed directly in the oven under admission of steam. Baking time amounted to 35 minutes.

After baking the loaf volume was measured by a seed displacement method. Specific volume of the loaves was 3.2 l per kg of bread for the Lindstrom procedure and 6.6 l per kg of bread for the procedure of the present invention.

Both loaves had a regular texture. The crust of the Lindstrom loaf was somewhat soft, whereas that of the present invention was crusty. The crumb of the Lindstrom loaf was denser than that of the present invention. A large difference in resilience of both crumbs was observed: which was good for the present invention and was only moderately resilient for Lindstrom. The crumb characteristics of the latter tended more towards that of cake. This finding is in agreement with the specific volume of the product, the specific volume of cake being 2.5 l per kg. The conclusion is that the Lindstrom product was well suitable for preparing a loaf in the kitchen, whereas the product of the present invention was also well suitable for large-scale production in bakeries.

C. RESULTS

The results as described above are summarized in the following table.

|  | Lindstrom | Present Invention |
|---|---|---|
| final proof time (min) | 90 | 50 |
| specific volume at the end of the final proof (1/kg) | 2.0 | 4.0 |
| baking time (min) | 40 | 35 |
| baking temperature (°C.) | 30–200 | 240 |
| loaf volume (1/kg) | 3.2 | 6.6 |

In preparing a loaf from a preproofed frozen piece, two factors are to be considered: dough pieces can collapse during freezing or during baking. To obtain a light-textured bread from preproofed frozen dough the dough must have the right stability.

In normal bread making procedures dough pieces are proofed to a specific volume of 3.0 to 4.0 l per kg of dough, depending on the type of loaf produced. During baking this specific volume is increased by the oven spring to a specific volume of 5.0 l to 7.0 l per kg of bread, again depending on the type of bread.

If an ordinary piece of dough is frozen at the end of the final proof (that is, with a specific volume of e.g. 4.0 l/kg) such a doughpiece collapses almost completely. The dough structure is not stable and the dough will shrink to a specific volume of less than 2.0 l/kg. This compares to the specific volume after mixing of less than 1.0 l/kg.

Doughpieces can also collapse during baking. This is the case when "normal" bread dough is frozen before baking. To obtain a good oven spring, it is essential to have a good structure of the dough, which is converted into a crumb structure during baking. In baking preproofed frozen dough, the oven spring is smaller than in a procedure with the same dough without freezing. To obtain a reasonably light product in a procedure like that described in the Lindstrom patent, the frozen doughpiece is placed in a cold oven in order to obtain an additional proof before baking. For this reason it is believed that it is essential that the melting point of the dough be as low as possible so that the dough can expand at the lowest possible temperature. The resulting product has a light texture which is, however, not as light as in ordinary bread.

In the technique of the present invention, the oven spring is not as large as in ordinary bread-making procedures, but it is larger than with prior art procedures, such as Lindstrom, where the dough is frozen. Together with a large proof before baking, a specific volume is obtained fully comparable to ordinary bread. This is only possible with a dough texture being stable during freezing.

Further Examples II–V of how the method of the present invention can be implemented, this time on a commercial scale, are given below.

EXAMPLE II
Processing: Italian Loaf (American Version)

| Step | | | |
|---|---|---|---|
| 1. | Ingredients | Flour | 100% |
| | | Salt | 2% |
| | | Yeast | 4% |
| | (*See page 23) | *Oil | 3% |
| | | Sugar | 1% |
| | | Eggs | 2% |
| | | *S.S.L. | 0.2% |
| | | *Garanta | 1% |
| | | Vital Wheat Gluten | 4% |
| | | Ethanol | 2% |
| | | (This is 3.3% on the water amount) | |
| | | Water | 41% |
| | | Ice | 20% |
| 2. | Mixing | *Mixer UC 120 2 Minutes Slow, 90 R.P.M. 10 Minutes Fast, 180 R.P.M. Dough Temperature 25° C. | |
| 3. | Bulk Fermentation | 3 + 4 Together 10 minutes. Bulk fermentation not required for "no time" dough | |
| 4. | Dividing Rounding | (see 3 above) | |
| 5. | Intermediate Proofing | 10 minutes | |
| 6. | Molding (Decoration) | Sheeting into thin layers 10 mm thick, molded 38 cm 2.5 curls, weight 520 gram | |
| 7. | Depositing | Layout on flat pan (40 × 60 cm = 1 × 3) | |
| 8. | Proofing | 90 minutes, 27° C., 75% RH Specific Volume 3.0 cc/gram | |
| 9. | Freezing | 120 minutes, −36° C. | |
| 10. | Incision Making | In the length of a loaf of bread on upper surface | |
| 11. | Packing | PE Bag (Closed) | |
| 12. | Store Transport (−18° C.) DC/Shops Store | The doughpieces are stored in a freezer with a temperature to −18° | |
| 13. | Baking | The product is placed without a defrosting step in a preheated oven, with a temperature of 260 to 200° C. for a deckoven and 240 to 180° C. for a rackoven. The product is baked with addition of steam. Specific Volume of Baked Product - 5.5 cc/gram | |

EXAMPLE III
Processing: French Bread (American Version)

| Step | | | |
|---|---|---|---|
| 1. | Ingredients | Flour | 100% |
| | | Salt | 2% |
| | | Yeast | 5% |
| | (*See page 23) | *Controller (S 500) | 3% |
| | | Sugar | 2% |

EXAMPLE III
Processing: French Bread (American Version)

| Step | | | |
|---|---|---|---|
| | | Vital Wheat Gluten | 2% |
| | | Ethanol | 2% |
| | | (This is 3.3% on the water amount) | |
| | | Water | 41% |
| | | Ice | 16% |
| 2. | Mixing | *Mixer UC 120 2 Minutes Slow, 90 R.P.M. 10 Minutes Fast, 180 R.P.M. Dough Temperature 25° C. | |
| 3. | Bulk Fermentation | 3 + 4 Together 10 minutes. Bulk fermentation not required for "no time" dough | |
| 4. | Dividing Rounding | (see 3 above) | |
| 5. | Intermediate Proofing | 10 minutes | |
| 6. | Molding (Decoration) | Sheeting into thin layers 5 mm thick, molded 50 cm 2.5 curls, weight 260 gram | |
| 7. | Panning or Depositing | Layout on flat pan (4 × 1) | |
| 8. | Proofing | 90 minutes, 27° C., 75% RH Specific Volume 3.0 cc/gram | |
| 9. | Freezing | 120 minutes, −36° C. | |
| 10. | Incision Making | 5 times, diagonally over top surface | |
| 11. | Packing | PE Bag (Closed) | |
| 12. | Store Transport (−18° C.) DC/Shop Store | The doughpieces are stored in a freezer with a temperature to −18° | |
| 13. | Baking | The product is placed without a defrosting step in a preheated oven, with a temperature of 260 to 200° C. for a deckoven and 240 to 180° C. for a rackoven. The product baked is with addition of steam (the last 5 minutes the value open to release steam. Specific Volume of Baked Product-4.5 cc/gram | |

EXAMPLE IV
Processing: Soft Rolls (American Version)

| Step | | | |
|---|---|---|---|
| 1. | Ingredients | Flour | 100% |
| | | Salt | 2% |
| | | Yeast | 6% |
| | (*See page 23) | *Oil | 4% |
| | | Sugar | 4% |
| | | *S.S.L. | 0.4% |
| | | *Garanta | 1% |
| | | Vital Wheat Gluten | 2% |
| | | Ethanol | 2% |
| | | (This is 3.3% on the water amount) | |
| | | Eggs | 3% |
| | | Water | 41% |
| | | Ice | 20% |
| 2. | Mixing | *Mixer UC 120 2 Minutes Slow, 90 R.P.M. 10 Minutes Fast, 180 R.P.M. Dough Temperature 25° C. | |
| 3. | Bulk Fermentation | 3 + 4 Together 10 minutes. Bulk fermentation not required for "no time" dough | |
| 4. | Dividing | 4 + 5 + 6 on the soft roll line (55 gram) | |
| 5. | Rounding | 5 + 6 Rounding and after 1 minute sheeting into a thin layer and then molding 4 mm thick, molded 11 cm | |
| 6. | Molding (Decoration) | 3 curls, 55 gram | |
| 7. | Depositing | Layout on a flat pan | |
| 8. | Proofing | 90 minutes, 27° C., 75% RH | |

EXAMPLE IV
Processing: Soft Rolls (American Version)

| Step | | |
|---|---|---|
| | | Specific Volume 4.0 cc/gram |
| 9. | Freezing | 90 minutes, −36° C. |
| 10. | Packing | PE Bag (Closed) |
| 11. | Store Transport (−18° C.) D/C Shops Store | The doughpieces are stored in a freezer with a temperature of −18° C. |
| 12. | Baking | The product is placed without a defrosting step in a preheated oven, with a temperature of 260 to 200° C. for a deckoven and 240 to 180° C. for a rackoven. The product is baked with addition of steam. Specific Volume of Baked Product - 6.5 cc/gram |

EXAMPLE V
Processing: Croissants (American Version)

| Step | | | | |
|---|---|---|---|---|
| 1. | Ingredients | Flour | 100% | |
| | | Salt | 2% | |
| | | Yeast | 5% | |
| | (*See page 23) | *S-kimo Green | 3% | |
| | | Milkpowder | 3% | |
| | | Ethanol | 2% | |
| | | (This is 3.3% on the water amount) | | |
| | | Water | 39% | 4° C. 1° C. |
| | | Ice | 21% | 0° C. |
| 2. | Mixing | *Mixer UC 120 2 min slow, 90 R.P.M. 6 min fast, 180 R.P.M. 1 min slow, 90 R.P.M. 4 min fast, 180 R.P.M. Dough Temperature 16° C. | | |
| 3. | Roll in Butter | 15% on the total amount of the dough, butter temperature 17° C. | | |
| 4. | Laminate | Laminate 12 layers | | |
| 5. | Cooling | 30 min by −36° C., the dough temperature will than be 9° C. | | |
| 6. | Sheeting | From 50 mm to 3 mm, on a sim line | | |
| 7. | Cut out | Cutting in triangle, 3 mm thick, 75 gram | | |
| 8. | Molding Panning or Depositing | Molding in a croissant molder Molded 15 cm, 5 curls | | |
| 9. | Proofing | 90 minutes, 27° C., 78% RH Specific Volume 3.0 cc/gram | | |
| 10. | Freezing | 60 minutes, −36° C. | | |
| 11. | Packing | PE Bag (Closed) | | |
| 12. | Store Transport (−18° C.) DC/Shops Store | The doughpieces are stored in a freezer with a temperature to −18° | | |
| 13. | Baking | The product is placed without a defrosting step in a preheated oven, with a temperature of 260 to 200° C. for a deckoven and 240 to 180° C. for a rackoven. The product is baked with addition of steam (the last 5 minutes the value open). Specific Volume of Baked Product - 4.9 cc/gram | | |

SPECIFICATIONS OF THE INGREDIENTS FOR EXAMPLES II-V

GARANTA:
Flour
Emulsifier = mono & diglycerides
Malt

Ascorbic
Enzymes

S.S.L.
Sodium Stearoyl -2- lactylate

S-Kimo Green:
Flour
Dextrose
Vegetable oil
Emulsifier=mono & diglycerides
Alpha amylase S-500 Controller:
Flour
Dextrose
Vegetable oil
Emulsifier=mono & diglycerides
Alpha amylase Canola Oil:
Monoglyceride Citrate
Dimenthylpoly Siloxane UC 120 Mixer:

The manufacturer of this mixer is Werner und Pfleiderer, Stuttgart, Germany. UC means Universal Batch Mixer and 120 is its capacity With the present invention, the final baked product will, after undergoing oven spring, preferably have a specific volume of between about 4.5 and 7 l per kg of dough depending on the type of loaf produced. At the final proofing step, the doughpieces are fully proofed to a specific volume of between about 2 and 4 l per kg of dough. With the test Example I, final proofing to specific volume of 4 l per kg resulted in an acceptable oven rise and final specific volume of 6.6 l per kg in the baked bread. On a commercial scale, the dough is preferably fully proofed from dough having a specific volume of about 1 l per kg of dough after mixing to about 3-4 l per kg of dough, or 3-4 cc per gram of dough as expressed in the Examples II-IV given above. This results in an acceptable final specific volume of 4.5-6.5 l per kg or 4.5-6.5 cc per gram in the baked bread products of the Examples.

It is observed that in view of the above, various modifications will readily occur to those skilled in the art. For instance, the above described additional steps for improving the quality of the product can be used each separately or in combination with any or all of the other features described. It is also possible sometimes to employ certain steps to a lesser degree than indicated, without this resulting in an end product of insufficient quality. Besides, compensation of one step by another is possible. It is for instance conceivable to use a yeast percentage of 5-8% with or without inputting a higher energy level to the kneading, step than indicated. Also a lower yeast percentage than indicated can be compensated by using for instance a special yeast strain.

Similarly, an energy level during the kneading step which is slightly lower than e.g. 160% of the conventional energy level might be compensated by a higher yeast percentage.

These and similar modifications are deemed to fall within the scope of the present invention.

I claim:

1. In a method of preparing frozen pieces of bread dough, in which the dough ingredients, including yeast and water, are kneaded, and subsequently fully shaped to a shape desired before baking and fully proofed doughpieces are prepared and frozen, which pieces of bread dough can be stored in a freezer and subsequently removed from the freezer, placed in an oven without a defrosting step and baked, the improvement which comprises kneading the dough ingredients at a high intensity, increasing the temperature of the dough ingredients during kneading by more than 10° C., and adding alcohol to the dough during kneading, said alcohol having a purity of 98% and being added in a quantity of between about 1.5 and 4% by weight of water used for the preparation of the dough.

2. The method as claimed in claim 1, wherein as the doughpieces are being shaped, the dough is degassed by rolling out the dough to a thin layer or sheet.

3. The method as claimed in claim 1, wherein a yeast percentage of between about 6 and 10% calculated on the flour weight is used.

4. The method as claimed in claim 1, wherein flour fortified with wheat gluten flour is used.

5. In a method of preparing pieces of frozen bread dough, in which dough ingredients, including yeast and water, are kneaded, and subsequently fully shaped to a shape desired before baking, and fully proofed doughpieces are prepared and frozen, which doughpieces can be stored in a freezer and then be removed from the freezer, placed in and oven without a defrosting step and baked, the improvement which comprises adding alcohol during kneading, said alcohol having a purity of 98% and being added in a quantity of between about 1.5 and 4% by weight of water used for the preparation of the dough.

6. The method as claimed in claim 5, wherein high-quality flour is used for the preparation of the doughpieces and the dough is degassed as the doughpieces are being shaped.

7. The method as claimed in claim 6, wherein a high yeast percentage is used.

8. In a method of preparing baked bread products from frozen pieces of bread dough, in which the dough ingredients are kneaded, and subsequently fully shaped and fully proofed doughpieces are prepared and frozen, which pieces of bread dough can be stored in a freezer and subsequently removed from the freezer, placed in an oven, without a defrosting step, and baked, the improvement which comprises kneading the dough at a high intensity, freezing the bread doughpieces in a freezer after they have been fully proofed, cutting at least one groove in the surface of the frozen doughpieces, subsequently removing one or more of the bread doughpieces from the freezer and placing the frozen doughpieces directly into an oven, and, without defrosting, baking the bread doughpieces to produce said baked bread products.

9. The method as claimed in claim 8, wherein a length of wet string is placed over the frozen doughpiece in the groove before the frozen doughpiece is placed in the oven.

10. In a method of preparing baked bread products from pieces of frozen bread dough, in which dough ingredients, including yeast and water, are kneaded, and subsequently fully shaped to a shape desired before baking, and fully proofed doughpieces are prepared and frozen, which doughpieces can be stored in a freezer and then be removed from the freezer, placed in an over without a defrosting step and baked, the improvement which comprises adding alcohol during kneading, said alcohol having a purity of 98% and being added in a quantity of between about 1.5 and 4% by weight of water used for the preparation of the dough, placing one or more of the frozen doughpieces directly into an oven and, without defrosting, baking the bread doughpieces to produce said baked bread products.

11. The method as claimed in claim 10, wherein a length of wet string is placed over the frozen doughpiece in one or more places before the frozen doughpiece is placed in the oven.

12. The method of preparing frozen doughpieces from dough ingredients including yeast and water comprising the steps of:
 a) mixing the dough ingredients at an energy level input of between about 80 and 100 KJ per kg of dough;
 b) adding ethanol to the dough ingredients during mixing and in an amount of between about 1 and 4% on the water weight basis;
 c) continuing the mixing of the dough ingredients to the stage where the dough is fully developed;
 d) fully shaping and fully proofing the mixed and fully developed dough into doughpieces of a shape desired before baking and to a specific volume of between about 2 and 4 l per kg of dough; and
 e) freezing the fully proofed doughpieces to a temperature of between about $-15°$ and $-30°$ C. to produce the frozen doughpieces.

13. The method according to claim 12 wherein:
 a) ethanol is added in an amount of between about 3 and 3.5% on a water weight basis.

14. The method according to claim 13 further including the step of:
 a) cutting at least one groove in the surface of the frozen doughpieces.

15. The method according to claim 14 wherein:
 a) the groove is cut at a width and depth of about ¼ cm.

16. The method according to claim 12 wherein:
 a) the mixing of the dough ingredients is carried out while increasing the temperature of the ingredients by between about 15° and 20° C.

17. The method according to claim 12 wherein:
 a) the temperature of the dough ingredients is increased to about 25° C. during the mixing thereof.

18. The method of preparing frozen doughpieces for use in the production of baked doughpieces having a specific volume of between about 4.5 and 7 l per kg of dough, said doughpieces being prepared from dough ingredients including yeast and water, the method comprising the steps of:
 a) mixing the dough ingredients at an energy input of between about 80 and 100 kJ per kg of dough;
 b) adding ethanol to the dough ingredients during mixing and in an amount of between about 3 and 3.5% on a water weight basis;
 c) continuing the mixing of the dough ingredients to a stage where the dough is fully developed;
 d) fully shaping and fully proofing the mixed and fully developed dough into doughpieces of a shape desired before baking and to a specific volume of between about 2 and 4 l per kg of dough; and
 e) freezing the fully proofed doughpieces to produce the frozen doughpieces.

19. The method according to claim 18 wherein:
 a) the mixing of the dough ingredients is continued over a period of time of about 12 minutes in a UC 120 mixer.

20. The method according to claim 18 further comprising the step of:
 a) cutting at least one groove in the surface of the doughpieces.

21. The method according to claim 20 wherein:
 a) the grooves are cut to a width and depth of about ¼ cm and are cut in substantially the same location on each of the doughpieces.

22. The method of preparing baked dough products from frozen doughpieces prepared according to either one of claims 1 or 18 comprising the steps of:
 a) placing the frozen doughpieces, without defrosting, in an oven preheated to baking temperature; and
 b) baking the doughpieces at said baking temperature to produce the baked dough products.

23. The method according to claim 22 wherein:
 a) the baking is continued until the specific volume of the bread is between about 4.5 and 7 l per kg of dough.

24. The method according to claim 23 further comprising the step of:
 a) baking the frozen doughpieces with the addition of steam during at least most of the baking step.

25. The method according to claim 24 further including the step of:
 a) cutting at least one groove in the surface of each frozen doughpiece; and
 b) placing a wet string in each groove prior to baking the frozen doughpiece.

26. The method of preparing baked dough products form frozen doughpieces of bread dough, in which the dough ingredients are kneaded, and subsequently fully shaped to a shape desired before baking and fully proofed doughpieces are prepared and frozen, which pieces of bread dough can be stored in a freezer and subsequently removed from the freezer, placed in an oven without a defrosting step and baked, the improvement which comprises kneading the dough ingredients at a high intensity, increasing the temperature of the dough ingredients during kneading by more than 10° C., placing the frozen doughpieces, without defrosting, in an oven preheated to baking temperature; and baking the doughpieces at said baking temperature to produce the baked dough products.

* * * * *